(12) United States Patent
Mannarswamy et al.

(10) Patent No.: US 8,495,662 B2
(45) Date of Patent: Jul. 23, 2013

(54) SYSTEM AND METHOD FOR IMPROVING RUN-TIME PERFORMANCE OF APPLICATIONS WITH MULTITHREADED AND SINGLE THREADED ROUTINES

(75) Inventors: Sandya Srivilliputtur Mannarswamy, Karnataka (IN); Sujoy Saraswati, Karnataka (IN); Prakash Sathyanath Raghavendra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1217 days.

(21) Appl. No.: 12/235,625

(22) Filed: Sep. 23, 2008

(65) Prior Publication Data

US 2010/0037242 A1    Feb. 11, 2010

(30) Foreign Application Priority Data

Aug. 11, 2008  (IN) .......................... 1930/CHE/2008

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................... 719/328; 719/320; 718/100

(58) Field of Classification Search
None
See application file for complete search history.

(56) References Cited

U.S. PATENT DOCUMENTS

| 6,826,752 | B1 * | 11/2004 | Thornley et al. ............... 718/100 |
| 2003/0097396 | A1 * | 5/2003 | Zhang et al. .................. 709/104 |
| 2004/0199919 | A1 * | 10/2004 | Tovinkere ..................... 718/102 |
| 2005/0097296 | A1 * | 5/2005 | Chamberlain et al. ......... 711/170 |
| 2005/0229176 | A1 * | 10/2005 | Findeisen ..................... 718/100 |
| 2007/0162526 | A1 * | 7/2007 | Printezis et al. ............... 707/206 |

* cited by examiner

*Primary Examiner* — H S Sough
*Assistant Examiner* — Craig Dorais

(57) ABSTRACT

A system and method for improving run-time performance of applications with multithreaded and single threaded routines that are linked with libpthreads library is disclosed. In one embodiment, a method for running a mixed ST/MT application program linked with libpthreads library including creating an interceptor library containing pthread application programming interface (pthread_API) call interceptors and loading the interceptor library into the mixed ST/MT application program, and running the mixed ST/MT application program by using light weight (LW) and heavy weight (HW) synchronization routines based on determining switchovers between ST and MT program modes, respectively, during run-time using the interceptor library.

14 Claims, 4 Drawing Sheets

SYSTEM AND METHOD FOR IMPROVING RUN-TIME PERFORMANCE OF APPLICATIONS WITH MULTITHREADED AND SINGLE THREADED ROUTINES

RELATED APPLICATIONS

Benefit is claimed under 35 U.S.C. 119(a)-(d) to Foreign application Ser No. 1930/CHE/2008 entitled "SYSTEM AND METHOD FOR IMPROVING RUN-TIME PERFORMANCE OF APPLICATIONS WITH MULTITHREADED AND SINGLE THREADED ROUTINES" by Hewlett-Packard Development Company, L.P., filed on 11 Aug. 2008, which is herein incorporated in its entirety by reference for all purposes.

BACKGROUND

Generally, multithreaded (MT) programs based on pthreads have considerably more overhead than single threaded (ST) programs due to synchronization requirements in standard threaded library routines during run-time. This overhead can significantly affect the performance of MT programs when they are used in an ST program mode.

One current technique addresses this problem by including an "MT" option that does not create multiple threads in the MT programs that uses pthread library calls and only operates in the ST program mode during run time. Another current technique solves the MT overhead problem for the ST programs that has been optimized by compilers to run like the MT programs by marking MT regions through pthread auto-parallelizations. Generally, such converted MT programs have well-defined MT regions since compiler decides when the ST program can begin and end to run as an MT program. This is generally accomplished by exporting interfaces from libpthreads for communicating the beginning and end of ST program mode to the libpthreads. Generally, the libpthreads use this information to decide whether to use a heavy weight (HW) synchronization or a light weight (LW) synchronization to improve performance.

However, the above techniques do not address the general problem of significant overhead created in the MT programs that alternate between the MT and ST program modes. Further, the current techniques cannot address the overhead problem in the MT programs when the existing legacy auto-parallelized/open market partition (MP) applications are created using older compilers which do not have the ability to mark when an MT program can begin and end, to run as an ST program. The above techniques address only one way first time switchover from the ST to MT program mode or vice versa and for subsequent threads, they continue to pay the excessive synchronization overhead.

There are many MT programs that run in the ST program mode most of the time and run on the MT program mode briefly, only to handle some service requests or perform certain compute intensive tasks. In such scenarios, these programs suffer from significant performance overhead due to the HW synchronization requirements in the standard threaded library routines. Typical example of such programs in producer/consumer type of applications includes Web applications which are usually written as threaded applications. In these applications, a main thread server waits for requests from a client and when one such request arrives, the main thread spawns a new thread (there can be many such requests). Upon completing the request the threads generally terminate and the main thread then waits again for another request from the clients. These MT programs are generally characterized by running most of the time in the ST program mode and only running in short periods in the MT program mode. However, such programs pay the penalty of performance overhead while using MT safe standard library routines for the entire time they are running. It can be seen that such programs suffer from excessive MT overhead due to high synchronization requirements that requires the pthread library calls to mutex_lock and mutex_unlock which use waiters list. The excessive MT overhead can be of the order of 2-3 times that of running an ST program without the MT overhead and this can significantly slowdown an application during run-time.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for improving run-time performance of applications with multithreaded and single threaded routines is disclosed. In the following description, for purposes of explanation, numerous specific details are set forth in order to provide a thorough understanding of the various embodiments. It will be evident, however, to one skilled in the art that the various embodiments may be practiced without these specific details.

The terms "pthread" refers to a set of C programming language types and procedure calls. For example, pthreads can include library of threads that use substantially same time shared resources, such as using same memory during run-time which requires mutex_lock and mutex_unlock. The term "mixed ST/MT application program" refers to an MT program that runs on an ST program mode most of the time and runs on an MT program mode briefly, only to handle some service requests or to perform certain compute intensive tasks. The terms "switch" and "switchover" is used interchangeably throughout the document.

Figure 1:
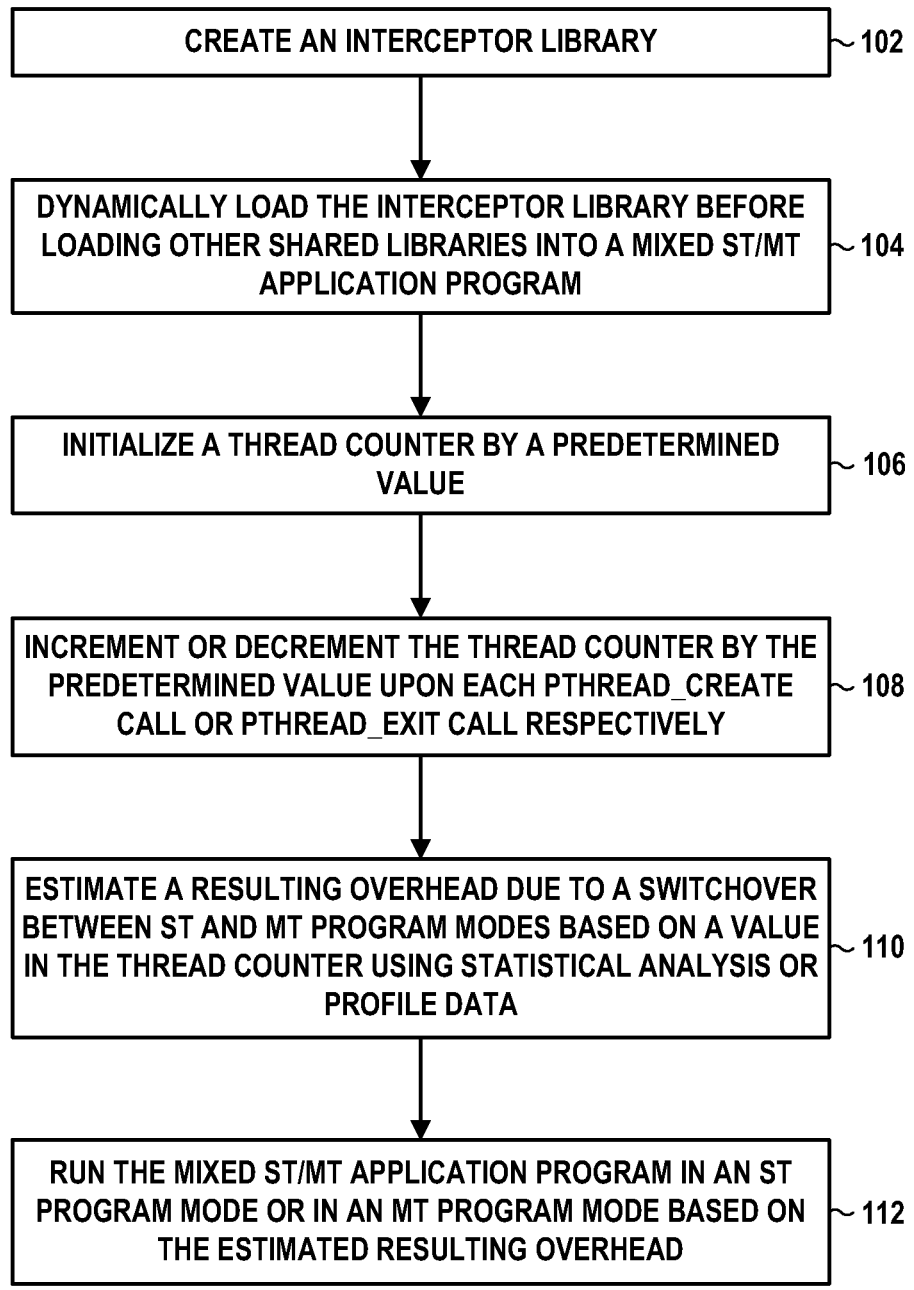
FIG. 1 illustrates a process flow of running mixed ST/MT application programs which are linked with libpthreads library, according to an embodiment.

FIG. 1 illustrates a process flow 100 of running a mixed single-threaded/multi-threaded (ST/MT) application programs which are linked with libpthreads library, according to an embodiment. In step 102, an interceptor library containing pthread application programming interface (pthread_API) call interceptors is created. In step 104, the interceptor library is dynamically loaded before loading other shared libraries into the mixed ST/MT application program.

In step 106, a thread counter is initialized by a predetermined value. In step 108, the thread counter is incremented or decremented by the predetermined value upon each pthread_ create call or pthread_exit call, respectively, during run-time. In one example embodiment, the mixed ST/MT application program may be run in an ST program mode by informing a pthreads library to call light weight (LW) synchronization routines or in an MT program mode by informing the pthreads library to call heavy weight (HW) synchronization routines based on a value in the thread counter.

In step 110, a resulting overhead due to switchovers between the ST and MT program modes is estimated using statistical analysis or profile data including pthread API calls based on previous mixed ST/MT application program that runs upon incrementing the thread counter by the predetermined value. In some embodiments, the statistical analysis or profile data (e.g., includes the pthread API calls) is based on determining duration of time during which the mixed ST/MT application program stays in the ST program mode during run-time and the estimated resulting overhead. In one example embodiment, the resulting overhead and expected percent of improvement are computed using the following equations:

Resulting overhead=number of locks to be converted*estimated overhead+helper thread overhead+pthread call overhead.

Expected percent of improvement=number of locks found during the period of time the mixed ST/MT application program runs in the ST program mode*estimated overhead for HW per lock.

In step 112, the mixed ST/MT application program may be run in the ST program mode by informing the pthreads library to call the LW synchronization routines or in the MT program mode by informing the pthreads library to call the HW synchronization routines based on the estimated resulting overhead. In one example embodiment, the mixed ST/MT application program may be run by using the LW and HW synchronization routines based on determining the switchovers between the ST and MT program modes, respectively, during run-time using the interceptor library.

In accordance with the above mentioned embodiments, the interceptor library (e.g., including the pthread API call interceptors) is created for libpthread library. Further, the interceptor library is loaded into the mixed ST/MT application program. In one example embodiment, a LD_PRELOAD environment variable is used to instruct a dynamic loader to load the interceptor library first before any other libraries, when it searches for shared libraries, for example, on an HPUX (Hewlett Packard Unix) operating system. Any pthread API call made by the mixed ST/MT application program is first resolved using the interceptor library. The interceptor library executes certain amount of book-keeping and makes the actual pthread API call. In one example embodiment, the interceptor library is loaded into already existing binaries (e.g., the mixed ST/MT application program), without the need to recompile the interceptor library.

Further, the interceptor library intercepts the pthread_create and pthread_exit calls. The interceptor library further keeps the thread counter to maintain a number of threads at any point of time. In one embodiment, the thread counter increments or decrements by the predetermined value upon each pthread_create call or pthread_exit call, respectively, during run-time. For example, the thread counter is initialized to 1, indicating execution of the main thread. Consider the mixed ST/MT application program is in ST program mode. From the ST program mode, when a call to pthread_create is made, the thread counter increments by the predetermined value and indicates that the mixed ST/MT application program is switched to the MT program mode. Similarly, a call to pthread_exit is made, the thread counter decrements by the predetermined value and indicates that the mixed ST/MT application program is switched to the ST program mode.

In operation, when the mixed application program switches from the MT program mode to the ST program mode, the dynamic optimizer determines whether it is profitable to inform pthreads library to call the LW synchronization routines. In one example embodiment, the dynamic optimizer (e.g., may be an Itanium® compiler/runtime roadmap) is enhanced to monitor the ST/MT application program. Further, book-keeping is required when the ST/MT application program switches from using the LW synchronization routines to the HW synchronization routines. Hence, it may not be profitable to make the HW synchronization routine switchover to the LW synchronization routine unless the ST program mode is sufficiently long enough to recover the overhead during the switch. Further, if it is decided that it is profitable to switch, the mixed ST/MT application program switches from the MT program mode to the ST program mode and informs the pthreads library accordingly. The LW synchronization routines are used during the ST program mode.

Further, when the application is about to re-enter the MT program mode, the dynamic optimizer checks which of the outstanding locks are held by the existing ST program mode, makes the mixed ST/MT application program to execute the HW synchronization routines for these locks, and then informs the pthreads library accordingly. This triggers the libpthread library to start using the HW synchronization routines when the mixed ST/MT application program shifts to the MT program mode. During switchover, if there are locks held by the ST program mode that are acquired while in the MT program mode, certain book-keeping and clean-up operation needs to be carried out to destroy the waiters's list etc. Due to which, the LW synchronization routines operate correctly on those locks. In another embodiment, the above described mechanism is also implemented within the libpthread library itself as illustrated in FIG. 2.

Figure 2:
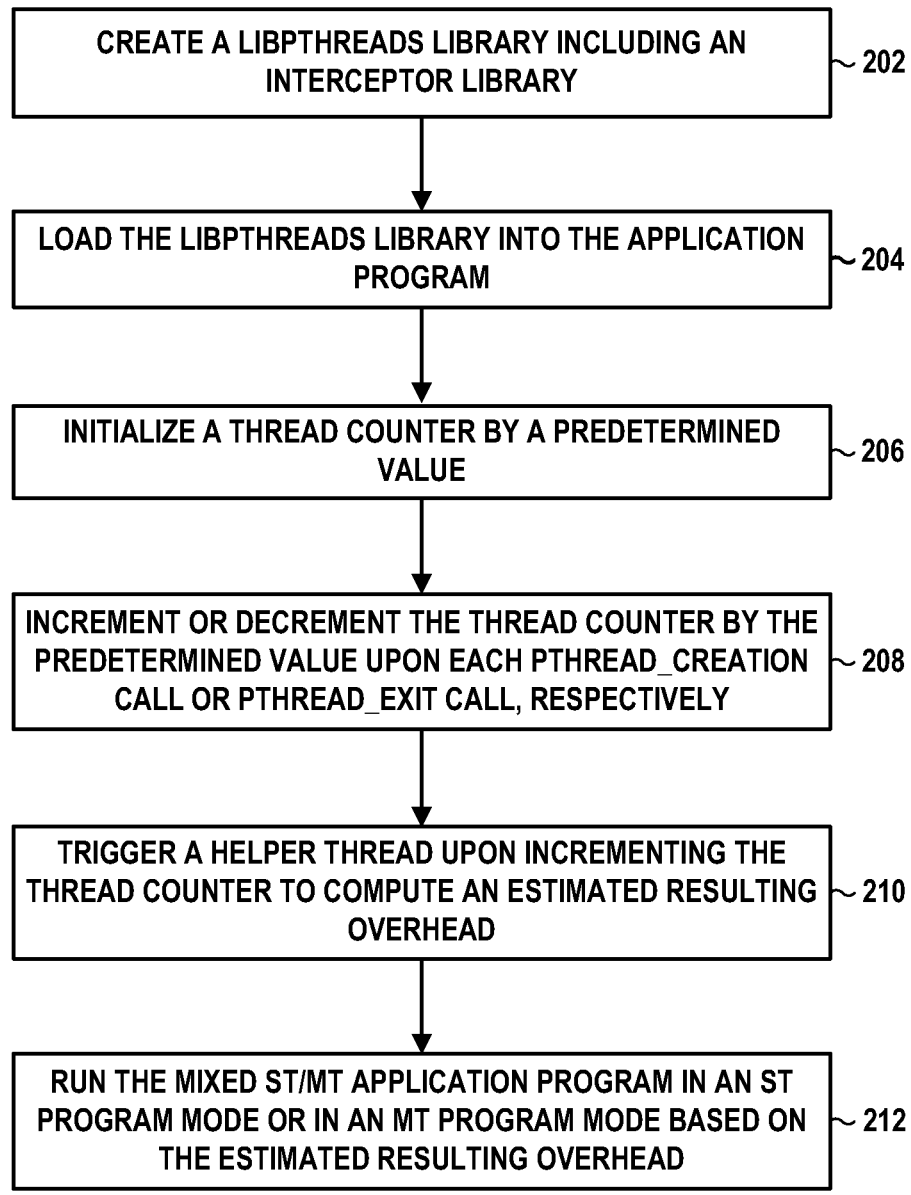
FIG. 2 illustrates a process flow of running mixed ST/MT application programs which are linked with libpthreads library, according to another embodiment.

FIG. 2 illustrates a process flow 200 of running a mixed ST/MT application programs which are linked with libpthreads library, according to another embodiment. In step 202, a libpthreads library including an interceptor library containing (API) call interceptors is created. In step 204, the libpthreads library is loaded into the mixed ST/MT application program.

In step 206, a thread counter is initialized by a predetermined value. In step 208, the thread counter is incremented or decremented by the predetermined value upon each pthread_create call or pthread_exit call, respectively, during run-time. In one example embodiment, the mixed ST/MT application program may be run in an ST program mode by informing pthreads library to call the LW synchronization routines or in an MT program mode by informing the pthreads library to call the HW synchronization routines based on a value-in the thread counter.

In step 210, a helper thread is triggered upon decrementing the thread counter by the predetermined value. In one example embodiment, the helper thread is triggered to compute an estimated resulting overhead by determining duration of time the mixed ST/MT application program runs in the ST program mode by examining sliced versions of the mixed ST/MT application program. In step 212, the mixed ST/MT application program may be run in the ST program mode by informing the pthreads library to call the LW synchronization routines or in the MT program mode by informing the pthreads library to call the HW synchronization routines based on the determined duration of time and the estimated resulting overhead. In one example embodiment, the mixed ST/MT application program may be run by using the LW and HW synchronization routines based on determining switchovers between the ST and MT program modes, respectively, during run-time using the interceptor library.

Figure 3:
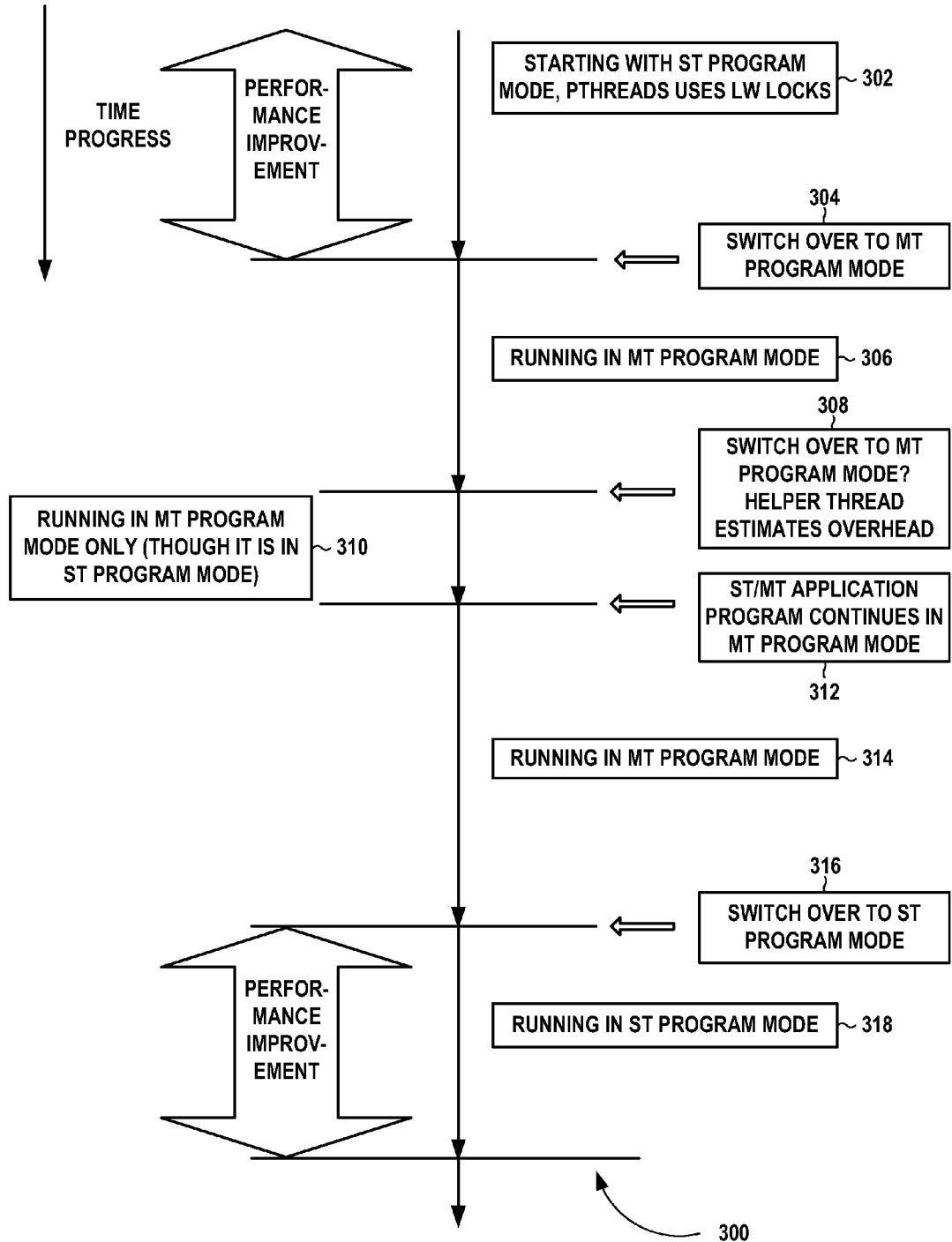
FIG. 3 is a schematic diagram illustrating the running of a mixed ST/MT program, such as those shown in FIGS. 1 and 2, according to an embodiment.

FIG. 3 is a schematic diagram illustrating the running of a mixed ST/MT application program, such as those shown in FIGS. 1 and 2, according to an embodiment. Particularly, FIG. 3 illustrates the switchovers between the ST and MT program modes as time progresses and estimation of the resultant overhead due to the switchovers between the ST and MT program modes. At 302, the mixed ST/MT application program starts in the ST program mode. In one example embodiment, in the ST program mode, the pthreads library calls the LW synchronization routines.

At 304, the mixed ST/MT application program switches to the MT program mode. In these embodiments, a check is made to determine whether the locks which have to be converted to HW locks are available. The dynamic optimizer checks which are the outstanding locks held by the existing ST program mode, makes the thread to execute the HW synchronization routines for these locks, and then informs the pthreads library accordingly. At 306, the mixed ST/MT application program runs in the MT program mode. In one example embodiment, in the MT program mode, the pthreads library calls the HW synchronization routines. As a consequence, the libpthread library is triggered to start using the HW synchronization routines. At 308, a check is made to determine whether the mixed ST/MT application program is to be switched to the ST program mode or not. At 310, if the helper thread estimates that the overhead is high, the mixed ST/MT application program runs in the MT program mode only, though the mixed ST/MT application program is in the ST program mode.

For example, when there is a switchover from the MT program mode to the ST program mode, a dynamic optimizer (e.g., Itanium® compiler/runtime roadmap) determines whether it (i.e., switchover from the MT program mode to the ST program mode) is profitable to inform the pthreads library to call the LW synchronization routines. In these embodiments, the dynamic optimizer may be enhanced to monitor the ST/MT application program mode. In one example embodiment, it is not profitable to make the synchronization routine to switchover from the MT program mode to the ST program mode unless the ST program mode is sufficiently long enough to recover the overhead in making the switch.

At 312, the mixed ST/MT application program continues to run in the MT program mode, since the helper thread estimates overhead is high, at 308. At 314, the mixed ST/MT application program runs in the MT program mode. In one embodiment, if the dynamic optimizer determines that it is profitable to switchover from the MT program mode to ST program mode, the dynamic optimizer informs the pthreads library that the mixed ST/MT application program to switch to the ST program mode. At 316, the mixed ST/MT application program switchovers to the ST program mode, during which the LW synchronization routines are used during the ST program mode. At 318, the ST/MT application program runs in the ST program mode and the ST/MT application program uses LW locks, thus avoiding the overhead when the ST/MT application program runs in the ST program mode. As illustrated in FIG. 3, the performance of the MT program is improved during the time period when the mixed ST/MT application program runs in the ST program mode.

Figure 4:
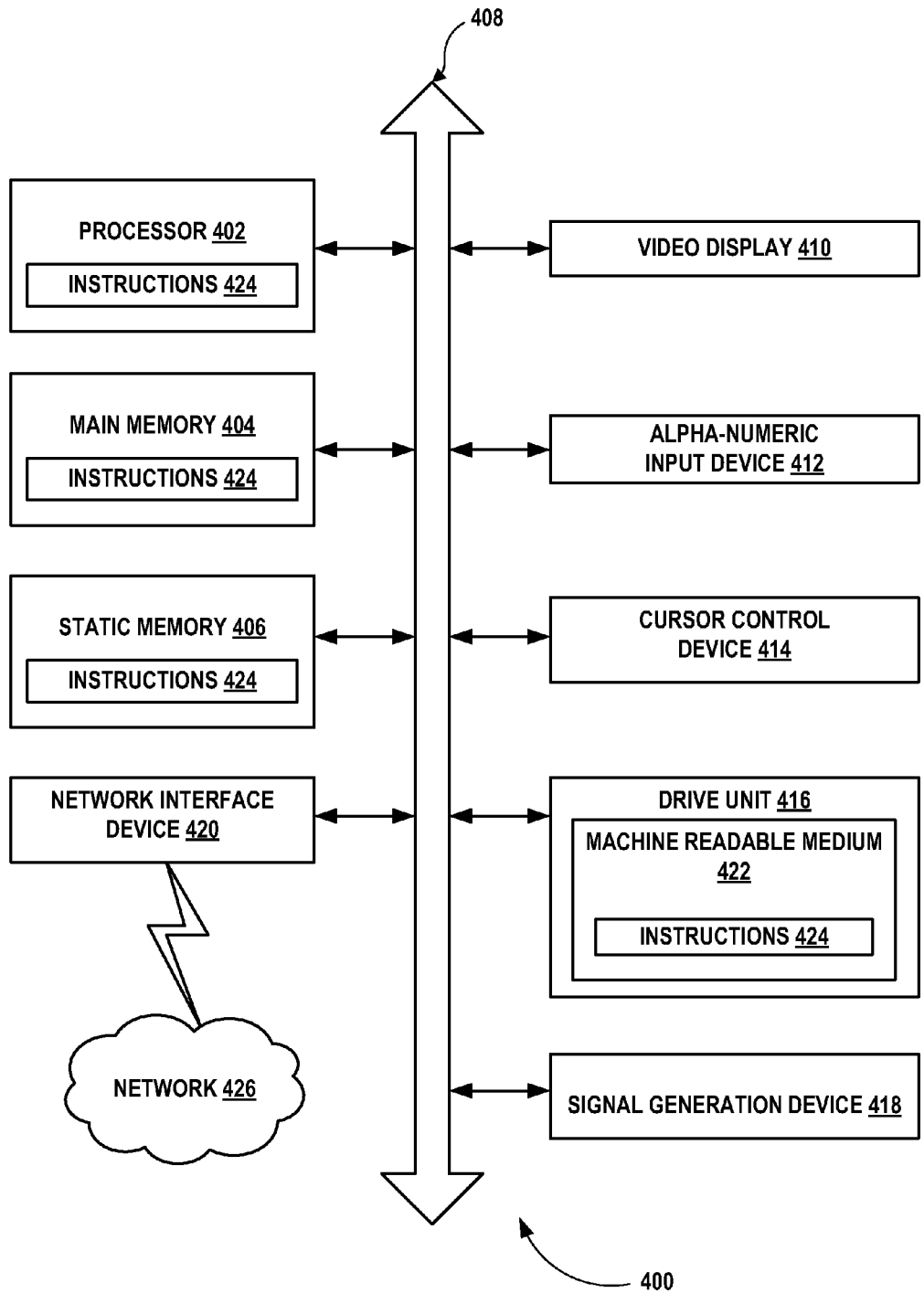
FIG. 4 is a diagrammatic system view of a data processing system in which any of the embodiments disclosed herein may be performed, according to one embodiment.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of the method of running the mixed ST/MT program linked with libpthreads library, including creating the interceptor library containing the pthread application programming interface (pthread_API) call interceptors and loading the interceptor library into the mixed ST/MT application program, and running the mixed ST/MT application program by using the LW and HW synchronization routines based on determining the switchovers between the ST and the MT program modes, respectively, during run-time using the interceptor library.

The storage medium may also have instructions to dynamically load the interceptor library before loading other shared libraries from the mixed ST/MT application program, to initialize the thread counter by the predetermined value, to increment or decrement the thread counter by the predetermined value upon each pthread_create call or pthread_exit call, respectively, during run-time, and to run the mixed ST/MT application program in the ST program mode by informing pthreads library to call the LW synchronization routines or in the MT program mode by informing the pthreads library to call the HW synchronization routines based on the value in the thread counter.

Also, the storage medium may have instructions to estimate a resulting overhead due to the switchovers between the ST and MT program modes using statistical analysis or profile data including pthread API calls based on previous mixed ST/MT application program runs upon incrementing the thread counter by the predetermined value, and to run the mixed ST/MT application program in the ST program mode by informing the pthreads library to call the LW synchronization routines or in the MT program mode by informing the pthreads library to call the HW synchronization routines based on the estimated resulting overhead.

Furthermore, a computer system includes a processor, a memory coupled to the processor, the memory having stored therein code which when decoded by the processor, the code causes the processor to perform the method of running the mixed ST/MT program linked with the libpthreads library, including creating the interceptor library containing the pthread application programming interface (pthread_API) call interceptors and loading the interceptor library into the mixed ST/MT application program, and running the mixed ST/MT application program by using the LW and HW synchronization routines based on determining the switchovers between the ST and MT program modes, respectively, during run-time using the interceptor library.

The above-described technique improves performance of arbitrarily mixed ST/MT application programs which are linked with the libpthread library, but remains in the ST program mode most of the time by reducing the requirement of excessive synchronization overhead even when running on the ST program mode. Further, the above technique improves performance of applications created using existing legacy auto-parallel/open market partition (MP) applications created with older compilers which do not have the ability to mark beginning and ending ST regions by reducing the need to pay for excessive synchronization overhead even when they are running in the ST program mode most of the time.

The above technique efficiently determines the transition from the MT program mode to the ST program mode and vice versa during runtime and communicates this transition information to the libpthreads to switchover the synchronization from the HW to LW synchronization routines. Further, the above technique ensures that the application semantics are not violated due to the switchover from the HW synchronization routines to LW synchronization routines. For example, if an applications thread has executed an "acquire lock" in the ST program mode (which would have been through the LW synchronization routines), and if the lock has not been released at the point of switching from the ST program mode to the MT program mode (and hence from the LW to HW synchronization routines), there is a need to ensure that subsequent unlock/lock operations for this lock using the HW synchronization routines perform as desired. In addition, the above technique determines the profitability of applying the switchover from the HW to LW synchronization routines selectively at MT/ST program mode transitions.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for running a mixed single-threaded/multi-threaded (ST/MT) application program linked with a libpthreads library, the method comprising:
   creating an interceptor library containing pthread application programming interface (pthread_API) call interceptors and loading the interceptor library into the mixed ST/MT application program;
   incrementing or decrementing a thread counter upon each pthread_create call or pthread_exit call, respectively, during run-time;
   triggering a helper thread upon decrementing the thread counter by a predetermined value, wherein the helper thread computes an estimated resulting overhead by determining a duration of time the mixed ST/MT application program runs in an ST program mode by examining sliced versions of the mixed ST/MT application program; and
   running the mixed ST/MT application program on a computer by using light weight (LW) and heavy weight (HW) synchronization routines based on determining switchovers between the ST program mode and an MT program mode, respectively, during run-time using the interceptor library, the mixed ST/MT application program being run in the ST program mode by informing a pthreads library to call the LW synchronization routines or in the MT program mode by informing the pthreads library to call the HW synchronization routines based on the determined duration of time and the estimated resulting overhead, selection between the ST program mode and the MT program mode being based on a value in the thread counter.

2. The method of claim 1, wherein running the mixed ST/MT application program by using the LW and HW synchronization routines based on determining the switchovers between the ST and MT program modes comprises:
   dynamically loading the interceptor library before loading other shared libraries into the mixed ST/MT application program; and
   initializing the thread counter.

3. The method of claim 1, wherein running the mixed ST/MT application program comprises:
   estimating a second resulting overhead due to the switchovers between the ST and MT program modes using statistical analysis or profile data including pthread API calls based on previous mixed ST/MT application program runs upon incrementing the thread counter by the predetermined value; and
   running the mixed ST/MT application program in the ST program mode by informing the pthreads library to call the LW synchronization routines or in the MT program mode by informing the pthreads library to call the HW synchronization routines based on the estimated second resulting overhead.

4. The method of claim 3, wherein the statistical analysis or profile data including the pthread API calls is based on the duration of time during which the mixed ST/MT application program stays in the ST program mode during run-time and the estimated second resulting overhead.

5. A method for running a mixed single-threaded/multi-threaded (ST/MT) application program linked with a libpthreads library, the method comprising:
   creating an interceptor library containing pthread application programming interface (pthread_API) call interceptors and loading the interceptor library into the mixed ST/MT application program; and running the mixed ST/MT application program on a computer by using light weight (LW) and heavy weight (HW) synchronization routines based on determining switchovers between ST and MT program modes, respectively, during run-time using the interceptor library, running the mixed ST/MT application program by using the LW and HW synchronization routines based on determining the switchovers between the ST and MT program modes comprising:
  dynamically loading the interceptor library before loading other shared libraries into the mixed ST/MT application program; and
  initializing a thread counter by a predetermined value;
  incrementing or decrementing the thread counter by the predetermined value upon each pthread_create call or pthread_exit call, respectively, during run-time; and
  running the mixed ST/MT application program in the ST program mode by informing a pthreads library to call the LW synchronization routines or in the MT program mode by informing the pthreads library to call the HW synchronization routines based on a value in the thread counter; and
running the mixed ST/MT application program comprising:
  triggering a helper thread upon decrementing the thread counter by the predetermined value, wherein the helper thread computes an estimated resulting overhead by determining a duration of time the mixed ST/MT application program runs in the ST program mode by examining sliced versions of the mixed ST/MT application program; and
  running the mixed ST/MT application program in the ST program mode by informing the pthreads library to call the LW synchronization routines or in the MT program mode by informing the pthreads library to call the HW synchronization routines based on the determined duration of time and the estimated resulting overhead, the resulting overhead and an expected percent of improvement being computed using the equations:

resulting overhead=number of locks to be converted*estimated overhead+helper thread overhead+pthread call overhead; and expected percent of improvement=number of locks found during the period of time the mixed ST/MT application program runs in the ST program mode*estimated overhead for HW per lock.

6. A method for running a mixed single-threaded/multi-threaded (ST/MT) application program linked with a libpthreads library, the method comprising:
  creating the libpthreads library including an interceptor library containing (API) call interceptors and loading the libpthreads library into the mixed ST/MT application program;
  incrementing or decrementing a thread counter upon each pthread_create call or pthread_exit call, respectively, during run-time;
  triggering a helper thread upon decrementing the thread counter by a predetermined value, wherein the helper thread computes an estimated resulting overhead by determining a duration of time the mixed ST/MT application program runs in an ST program mode by examining sliced versions of the mixed ST/MT application program; and
  running the mixed ST/MT application program on a computer by using LW and HW synchronization routines based on determining switchovers between the ST program mode and an MT program mode, respectively, during run-time using the interceptor library, the mixed ST/MT application program being run in the ST program mode by informing a pthreads library to call the LW synchronization routines, or in the MT program mode by informing the pthreads library to call the HW synchronization routines based on the determined duration of time and the estimated resulting overhead, selection between the ST program mode and the MT program mode being based on a value in the thread counter.

7. The method of claim 6, wherein running the mixed ST/MT application program by using the LW and HW synchronization routines based on determining the switchovers between the ST and MT program modes comprises:
  loading the libpthreads library into the mixed ST/MT application program; and
  initializing the thread counter.

8. The method of claim 6, wherein running the mixed ST/MT application program comprises:
  estimating a second resulting overhead due to the switchovers between the ST and MT program modes using statistical analysis or profile data including pthread API calls based on previous mixed ST/MT application program runs upon incrementing the thread counter by the predetermined value; and
  running the mixed ST/MT application program in the ST program mode by informing the pthreads library to call the LW synchronization routines or in the MT program mode by informing the pthreads library to call the HW synchronization routines based on the estimated second resulting overhead due to the switchovers between the ST and MT program modes.

9. A computer readable storage medium comprising instructions which, when executed by a computer, cause the computer to run a mixed ST/MT program linked with libpthreads library, the instructions comprising:
  creating an interceptor library containing pthread application programming interface (pthread_API) call interceptors and loading the interceptor library into the mixed ST/MT application program;
  incrementing or decrementing a thread counter upon each pthread_create call or pthread_exit call, respectively, during run-time;
  triggering a helper thread upon decrementing the thread counter by a predetermined value, wherein the helper thread computes an estimated resulting overhead by determining a duration of time the mixed ST/MT application program runs in an ST program mode by examining sliced versions of the mixed ST/MT application program; and
  running the mixed ST/MT application program by using LW and HW synchronization routines based on determining switchovers between the ST program mode and an MT program mode, respectively, during run-time using the interceptor library, the mixed ST/MT application program being run in the ST program mode by informing a pthreads library to call the LW synchronization routines or in the MT program mode by informing the pthreads library to call the HW synchronization routines based on the determined duration of time and the estimated resulting overhead, selection between the ST program mode and the MT program mode being based on a value in the thread counter.

10. The storage medium of claim 9, wherein running the mixed ST/MT application program by using the LW and HW synchronization routines based on determining the switchovers between the ST and MT program modes comprises:

dynamically loading the interceptor library before loading other shared libraries into the mixed ST/MT application program; and initializing the thread counter.

11. The article storage medium of claim 9, wherein running the mixed ST/MT application program comprises:

estimating a second resulting overhead due to the switchovers between the ST and MT program modes using statistical analysis or profile data including pthread API calls based on previous mixed ST/MT application program runs upon incrementing the thread counter by the predetermined value; and running the mixed ST/MT application program in the ST program mode by informing the pthreads library to call the LW synchronization routines or in the MT program mode by informing the pthreads library to call the HW synchronization routines based on the estimated second resulting overhead.

12. A computer system comprising:

a processor; and a memory in communication with the processor, the memory to store instructions which, when executed by the processor, cause the processor to perform a method of running a mixed ST/MT application program linked with a libpthreads library, the method comprising:

creating an interceptor library containing pthread application programming interface (pthread_API) call interceptors and loading the interceptor library into the mixed ST/MT application program;

incrementing or decrementing a thread counter upon each pthread_create call or pthread_exit call, respectively, during run-time;

triggering a helper thread upon decrementing the thread counter by a predetermined value, wherein the helper thread computes an estimated resulting overhead by determining a duration of time the mixed ST/MT application program runs in an ST program mode by examining sliced versions of the mixed ST/MT application program; and running the mixed ST/MT application program by using LW and HW synchronization routines based on determining switchovers between the ST program mode and an MT program mode, respectively, during runtime using the interceptor library, the mixed ST/MT application program being run in the ST program mode by informing a pthreads library to call the LW synchronization routines or in the MT program mode by informing the pthreads library to call the HW synchronization routines based on the determined duration of time and the estimated resulting overhead, selection between the ST program mode and the MT program mode being based on a value in the thread counter.

13. The system of claim 12, wherein running the mixed ST/MT application program by using the LW and HW synchronization routines based on determining the switchovers between the ST and MT program modes comprises:

dynamically loading the interceptor library before loading other shared libraries into the mixed ST/MT application program; and initializing the thread counter.

14. The system of claim 12, wherein running the mixed ST/MT application program comprises:

estimating a second resulting overhead due to the switchovers between the ST and MT program modes using statistical analysis or profile data including pthread API calls based on previous mixed ST/MT application program runs upon incrementing the thread counter by the predetermined value; and running the mixed ST/MT application program in the ST program mode by informing pthreads library to call the LW synchronization routines or in the MT program mode by informing the pthreads library to call the HW synchronization routines based on the estimated second resulting overhead.

* * * * *

UNITED STATES PATENT AND TRADEMARK OFFICE
CERTIFICATE OF CORRECTION

PATENT NO. : 8,495,662 B2
APPLICATION NO. : 12/235625
DATED : July 23, 2013
INVENTOR(S) : Sandya Srivilliputtur Mannarswamy et al.

Page 1 of 1

It is certified that error appears in the above-identified patent and that said Letters Patent is hereby corrected as shown below:

In the Claims:

In column 11, line 7, in Claim 11, delete "article storage" and insert -- storage --, therefor.

Signed and Sealed this
Twelfth Day of November, 2013

Teresa Stanek Rea
*Deputy Director of the United States Patent and Trademark Office*